Nov. 19, 1968  J. W. ABSON ET AL  3,412,017
SEWAGE TREATMENT

Filed May 27, 1966  3 Sheets-Sheet 3

INVENTORS
JAMES WILLIAM ABSON
ERIC INNES CLARK

By: Norris & Bateman, Attys 3,412,017
SEWAGE TREATMENT
James W. Abson, Stockport, and Eric I. Clark, Cheadle,
England, assignors to Simon-Carnes Limited, Stockport,
Cheshire, England, a British company
Filed May 27, 1966, Ser. No. 553,386
Claims priority, application Great Britain, June 17, 1965,
25,597/65
2 Claims. (Cl. 210—7)

ABSTRACT OF THE DISCLOSURE

In the treatment of sewage by the activated sludge process, primary settled sewage is aerated and then passed to a settling stage, from which stage the sludge is recycled to the aeration stage so as to maintain the suspended solids concentration in the aeration stage between 12,240 and 30,000 parts per million and provide a dissolved oxygen concentration of material passing from the aeration stage to the settling stage of at least 30% of saturation.

---

This invention is concerned with improvements in or relating to sewage treatment.

In the treatment of sewage for disposal by the activated sludge process the sewage is subjected to a primary settling treatment to remove the coarser solids, followed by aeration in contact with an activated sludge and further settling.

It is an object of the invention to provide an improved method of treating primary settled sewage.

It is another object of the invention to provide apparatus constructed and arranged for use in carrying out such a method.

The invention provides a method of treating primary settled sewage for disposal comprising the steps of aerating the sewage in contact with an activated sludge, settling sludge from the aerated material, and recycling sludge from the settling step to the aeration step, the dissolved oxygen concentration of the material passing from the aeration step to the settling step being high, and the suspended solids concentration in the aeration step being high.

The invention also provides a method of treating primary settled sewage for disposal comprising the steps of aerating the sewage in contact with an activated sludge, settling sludge from the aerated material, and recycling sludge from the settling step to the aeration step, the dissolved oxygen concentration of the material passing from the aeration step to the settling step being at least 30% of saturation, and the suspended solids concentration (105° C.) in the aeration step being between 6,000 and 30,000 parts per million.

Preferably said dissolved oxygen concentration is between 35% and 65% of saturation.

It is believed that the high dissolved oxygen concentration and the high suspended solids concentration permit a high throughput for a given size of apparatus and a low retention period.

There now follows a description, to be read with reference to the accompanying drawings, of apparatus and a method embodying the invention. This description is given by way of example of the invention only and not by way of limitation thereof.

Figure 1:
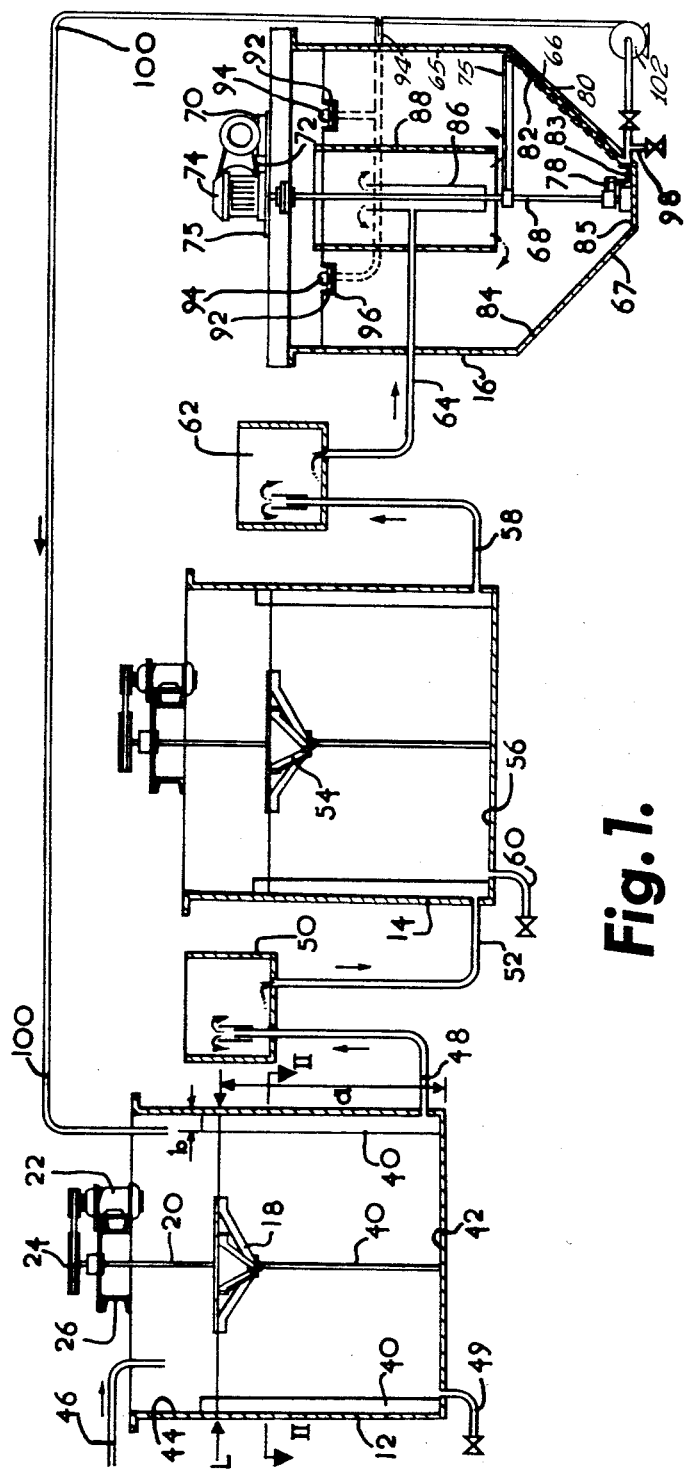
Figure 2:
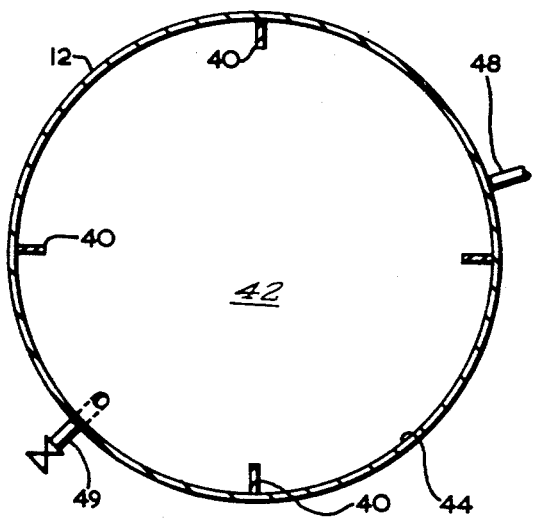
Figure 3:
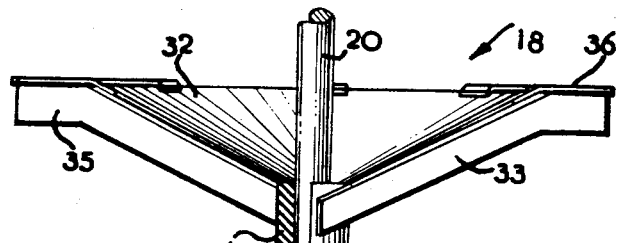
Figure 4:
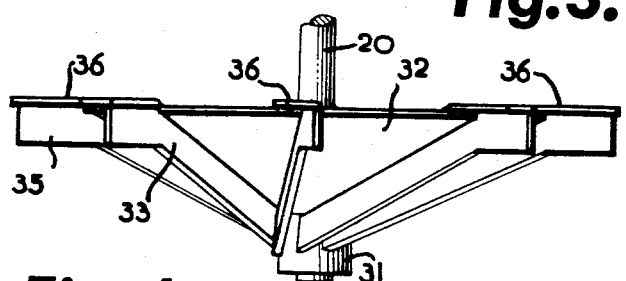
Figure 5:
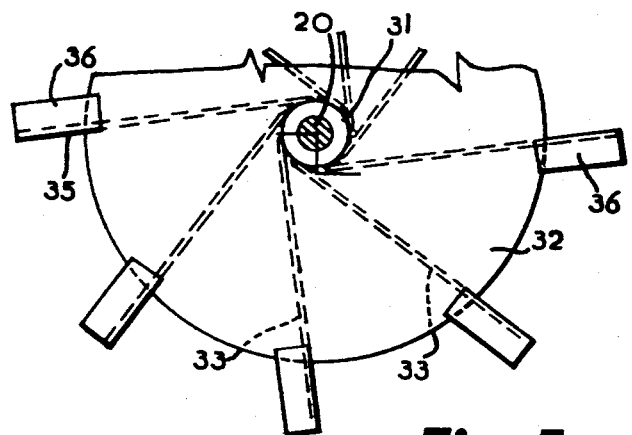

In the drawings:
FIGURE 1 shows a flow diagram of the apparatus;
FIGURE 2 shows a sectional plan view of an aeration tank of the apparatus;
FIGURE 3 shows a sectional side view of an aerator member of the apparatus;
FIGURE 4 shows an outside view corresponding to FIGURE 3; and
FIGURE 5 shows a plan view of the aerator member.

The apparatus comprises a first aeration tank 12, a second aeration tank 14 and a settling tank 16. In the operation of the apparatus primary settled sewage enters the tank 12 and passes from the tank 12 to the tank 14, being aerated in the tanks 12, 14 in contact with an activated sludge; the aerated material passes from the tank 14 to the tank 16 where sludge is settled therefrom leaving a clear effluent which is disposed of by discharging into a water course. The dissolved oxygen concentration of the material passing from the tank 14 to the tank 16 is high, being at least 30% of saturation.

The tank 12 is uniformly circular in cross-section and a surface aerator member 18 is mounted co-axially therein for rotation to aerate the sewage. The aerator member 18 corresponds generally in construction and arrangement to the aerator member described in our U.K. patent specification No. 919,467 to which reference may be made. The member 18 is mounted for rotation on a vertical shaft 20 which is driven in the operation of the apparatus by a motor 22 through a belt drive 24. The shaft 20 and the motor 22 are supported by a structure 26 extending across the top of the tank 12.

The aerator member 18 (FIGURES 3 to 5) comprises an inverted frusto-conical shell 32 symmetrical about the shaft 20, a circular cylindrical boss 31 of small diameter secured to, and extending downwardly from, the shell 32 coaxially therewith, the shaft 20 being secured in the boss 31, and a plurality of arms 33 each of which lies in a vertical plane and is secured to the boss 31 extending tangentially to the boss 31 along the lower surface of the shell 32. Each arm 33 has an end portion 35 extending outwardly from the outer periphery of the shell 32. Each end portion 35 has a horizontal upper edge in the plane of the outer periphery of the shell 32, and has a horizontal plate 36 which extends circumferentially from the edge on the side of the arm 33 remote from the boss 31 (FIGURE 5), and outwardly from the outer periphery of the shell 32. In the operation of the apparatus the member 18 is rotated at constant angular velocity in the sense in which the plates 36 extend circumferentially from the arms 13 with the plates 36 at, or a little above, the level L of the sewage in the tank 12 (FIGURE 1).

Four vertical rectangular radial baffles 40 (FIGURES 1 and 2) are secured in the tank 12; the baffles 40 are uniformly spaced around the tank 12 and each extends upwardly from a lower wall 42 of the tank 12 and inwardly from a peripheral wall 44 thereof. The baffles 40 are of uniform size.

The sewage enters the tank 12 by a line 46, which terminates above the level L, and leaves the tank 12 by a line 48 which leads out of the tank 12 close to the lower wall 42. A drain 49 leads from the tank 12 through the wall 42.

The apparatus comprises an adjustable overflow box 50 arranged to control the liquid level L; the line 48 leads into box 50.

The aerated material leaves the overflow box 50 by a line 52 which leads into the tank 14.

The tank 14 corresponds in construction, arrangement and mode of operation to the tank 12, and has an aerator member 54 mounted therein for rotation to aerate the material therein; the aerator member 54 corresponds to the aerator member 18. The line 52 leads into the tank 14 close to a lower wall 56 thereof. The material leaves the tank 14 by a line 58 which leads out of the tank 14 close to the lower wall 56. A drain 60 leads from the tank 14 through the wall 56.

The apparatus comprises a further adjustable overflow box 62 corresponding to the box 50 and arranged to control the liquid level in the tank 14; the line 58 leads into the box 62.

The aerated material leaves the overflow box 62 by a line 64 which leads into the settling tank 16.

The settling tank 16 comprises an upper portion 65 of uniform circular cross-section and a lower conical portion 67.

A chain scraper 66 is mounted in the tank 16 for rotation therein to facilitate sludge recovery. The chain scraper 66 is mounted for rotation on a vertical shaft 68 which is mounted coaxially in the tank 16 and is driven in the operation of the apparatus by a motor 70 through a belt drive 72 and a gear box 74; the gear box 74 and motor 70 are supported on a structure 75 extending across the top of the tank 16. The scraper 66 comprises a horizontal arm 76 which is secured to the shaft 68 and extends outwardly therefrom almost to the junction between the portions 65, 67 at the level of said junction; the scraper 66 also comprises a short horizontal arm 78 which is also secured to the shaft 68 and extends outwardly therefrom in alignment with the arm 76 close to the bottom of the portion 67. A chain 80 extends from an outer end portion of the arm 76 to an outer end portion of the arm 78 and comprises an upper, straight, portion 82 arranged to scrape an inner conical surface 84 of the portion 67 and a lower, looped, portion 83 arranged to scrape a lower flat horizontal surface 85 of the portion 67.

A circular cylinder 86 is mounted in the tank 16 above the scraper 66 and around the shaft 68 co-axially therewith; the cylinder 86 is closed at its bottom and open at its top and is completely immersed in the operation of the apparatus. Another circular cylinder 88 is mounted in the tank 16 above the scraper 66 and around the cylinder 86 coaxially therewith; the cylinder 88 is open at its top and also open at its bottom, and extends above the liquid level in the tank 16 in the operation of the apparatus; the cylinder 88 also extends a little below the cylinder 86. The line 64 leads through the cylinder 88 into the cylinder 86, and in the operation of the apparatus material flows upwardly out of the cylinder 86 and downwardly out of the cylinder 88. Sludge accumulating at the top of the cylinder 88 has occasionally to be removed in the operation of the apparatus.

Two level parallel horizontal overflow channels 92 extend across the tank 16 on either side of the cylinder 88; each channel 92 leads to an outlet line 94. In the operation of the apparatus clear effluent leaves the tank 16 through the channels 92 and the lines 94.

Sludge leaves the bottom of the tank 16 and a portion of it flows by gravity along a line 98 which leads to sludge drying beds (not shown). The remainder of the sludge leaving the tank 16 is recycled along a line 100 to the tank 12 by a pump 102. A high rate of sludge recycle is used to maintain the suspended solids concentration (105° C.) in the tanks 12, 14 between 6,000 and 30,000 parts per million.

Nitrifying bacteria may be present to reduce the ammonia content of the sewage.

In the first modified form of the apparatus the primary settled sewage enters the tank 14 rather than the tank 12; otherwise this modified form of the apparatus corresponds in construction, arrangement and mode of operation to the apparatus shown in the drawings.

In a second modified form of the apparatus the tank 12 is omitted, primary settled sewage enters the tank 14 and sludge from the tank 16 is recycled to the tank 14. Otherwise this modified form of the apparatus corresponds in construction, arrangement and mode of operation to the apparatus shown in the drawings.

*Example I.—Primary settled sewage*

| | |
|---|---|
| pH | 6.9 |
| Permanganate value | p.p.m__ 47 |
| Chemical oxygen demand | p.p.m__ 400 |
| Biochemical oxygen demand | p.p.m__ 176 |
| Ammonia ($NH_4$) | p.p.m__ 49 |

This primary settled sewage was treated at 18° C. in apparatus corresponding to that shown in the drawings under the following conditions—

Aeration tanks:
    Depth of tank _____ 6'4".
    Liquid depth _____ 4'4".
    Diameter of tank _____ 6'6".
    Capacity _____ 900 gallons.
    External diameter of shells of aerator members (between outer edges of deflectors 36) _____ 2'2".
    Speed of aerator members _____ 100 r.p.m.

Baffles:
    4" wide in the first tank.
    3" wide in second tank.
    Retention time in each aeration tank ___ 1.25 hours.

Settling tank:
    Overall depth _____ 6'5".
    Diameter _____ 6'6".
    Depth of conical portion _____ 2'8".
    Angle of cone _____ 45°.
    Capacity _____ 900 gallons.
    Feed rate of primary settled sewage _____ 12 gallons/minute.
    Rate of sludge recycle _____ 12 gallons/minute (100% recycle).

Nitrifying bacteria were not present.

The following results were obtained:

| | From first aeration tank (12) | From second aeration tank (14) | Effluent from settling tank (16) |
|---|---|---|---|
| pH | 7.3 | 7.3 | 7.1 |
| Permanganate value (p.p.m.) | 10 | 10 | 14 |
| Chemical oxygen demand (p.p.m.) | 95 | 78 | 95 |
| Biochemical oxygen demand (p.p.m.) | 41 | 41 | 19 |
| Ammonia ($NH_4$) (p.p.m.) | 48 | 42 | 46 |
| Settled sludge volume (percent) | 47 | 46 | |
| Sludge volume index | 76 | 70 | |
| Suspended solids (105° C.) (p.p.m.) | 6,200 | 6,900 | 40 |
| Suspended solids (600° C.) (p.p.m.) | 1,400 | 1,600 | Nil |
| Dissolved oxygen (percent of saturation) | 63 | 85 | 17 |

*Example II.—Primary settled sewage*

| | |
|---|---|
| pH | 6.6 |
| Permanganate value | p.p.m__ 51 |
| Chemical oxygen demand | p.p.m__ 387 |
| Biochemical oxygen demand | p.p.m__ 183 |
| Ammonia ($NH_4$) | p.p.m__ 52 |

This primary settled sewage was treated at 17.5° C. in apparatus corresponding to the first modified form of the apparatus shown in the drawings under conditions corresponding to those of Example I.

The following results were obtained:

| | From first aeration tank (12) | From second aeration tank (14) | Effluent from settling tank (16) |
|---|---|---|---|
| pH | 7.1 | 7.4 | 7.4 |
| PV (p.p.m.) | 19 | 11 | 6 |
| COD (p.p.m.) | 163 | 79 | 41 |
| BOD (p.p.m.) | >82 | 46 | 6 |
| NH$^4$ (p.p.m.) | 61 | 53 | 59 |
| Settled sludge vol. (percent) | 98 | 77 | |
| Sludge volume index | 62.2 | 101 | |
| Suspended solids (105° C.), (p.p.m.) | 15,750 | 7,550 | 10 |
| Suspended solids (600° C.) (p.p.m.) | 4,100 | 2,500 | 10 |
| DO (percent of saturation) | 72 | 73 | 6 |

Example III.—Primary settled sewage pH ------------------------------------- 6.9
PV ------------------------------- p.p.m -- 50
COD ------------------------------ p.p.m -- 374
BOD ------------------------------ p.p.m -- 197
NH$_4$ --------------------------- p.p.m -- 50

The procedure of Example II was substantially repeated, the sewage being treated at 17° C.

Results:

| | From first Aeration Tank | From second Aeration Tank | Effluent from Settling Tank |
|---|---|---|---|
| pH | 7.3 | 7.2 | 7.2 |
| PV (p.p.m.) | 15 | 11 | 9 |
| COD (p.p.m.) | 159 | 76 | 10 |
| BOD (p.p.m.) | 127 | 49 | 10 |
| NH$^4$ | 58 | 59 | 56 |
| Settled sludge vol. (percent) | 99 | 91 | |
| Sludge volume index | 53.2 | 101 | |
| Suspended solids (105° C.), (p.p.m.) | 18,600 | 9,000 | 120 |
| Suspended solids (600° C.), (p.p.m.) | 6,000 | 2,900 | 80 |
| DO (percent of saturation) | 75 | 66 | 12 |

Example IV.—Primary settled sewage pH ------------------------------------- 7.0
PV ------------------------------- p.p.m -- 52
COD ------------------------------ p.p.m -- 483
BOD ------------------------------ p.p.m -- 230
NH$_4$ --------------------------- p.p.m -- 71
NO$_3$ --------------------------------- Nil The procedure of Example II was substantially repeated with nitrifying bacteria added to the second aeration tank, the sewage being treated at 17° C.

Results:

| | From first Aeration Tank | From second Aeration Tank | Effluent from Settling Tank |
|---|---|---|---|
| pH | 7.4 | 7.6 | 7.4 |
| PV (p.p.m.) | 12 | 8 | 9 |
| COD (p.p.m.) | 58 | 30 | 29 |
| BOD (p.p.m.) | <4 | <4 | 4 |
| NH$^4$ (p.p.m.) | 20 | 39 | 25 |
| NO$^3$ | Nil | Trace | Trace |
| Settled sludge volume (percent) | 98 | 88 | |
| Sludge volume index | 49.3 | 89.6 | |
| Suspended solids (105° C.), (p.p.m.) | 19,860 | 9,820 | 104 |
| Suspended solids (600° C.), (p.p.m.) | 6,620 | 3,340 | 28 |
| DO (percent of saturation) | 47 | 50 | 5.4 |

The reduction in ammonia concentration from the concentration in the primary settled sewage and the presence of nitrate indicates the action of the nitrifying bacteria.

Examples V–X

The procedure of Example IV was substantially repeated; Examples V–X are summarised in Tables I to III below in which:

P indicates primary settled sewage
T$_1$ indicates from first aeration tank
T$_2$ indicates from second aeration tank and
E indicates effluent from settling tank

TABLE I

| | Example V Temperature, 14° C. | | | | Example VI Temperature, 16° C. | | | |
|---|---|---|---|---|---|---|---|---|
| | P | T$_1$ | T$_2$ | E | P | T$_1$ | T$_2$ | E |
| pH | 6.8 | 6.9 | 6.9 | 6.8 | 7.3 | 6.8 | 6.9 | 6.9 |
| PV (p.p.m.) | 43 | 11 | 8 | 9 | 75 | 11 | 10 | 8 |
| COD (p.p.m.) | 323 | 76 | 34 | 48 | 644 | 201 | 111 | 76 |
| BOD (p.p.m.) | 191 | 31 | 23 | 13 | 299 | 38 | 13 | 7 |
| NH$^4$ (p.p.m.) | 51 | 21 | 30 | 25 | 61 | 24 | 29 | 22 |
| NO$^3$ | Nil | Trace | Trace | Trace | Nil | Trace | Positive | Trace |
| Settled sludge volume (percent) | 97 | 76 | | | 91 | 70 | | |
| Sludge volume index | | 79.1 | 111 | | | 62.8 | 79.8 | |
| Suspended solids (105° C.), (p.p.m.) | | 12,240 | 6,840 | 248 | 625 | 14,540 | 8,780 | 336 |
| Suspended solids (600° C.), (p.p.m.) | | 4,320 | 2,520 | 116 | | | | |
| DO (Percent of saturation) | | 96 | 94 | 17 | 1.7 | 65 | 50 | 4.1 |

TABLE II

| | Example VII Temperature, 19.5° C. | | | | Example VIII Temperature, 17.5° C. | | | |
|---|---|---|---|---|---|---|---|---|
| | P | T$_1$ | T$_2$ | E | P | T$_1$ | T$_2$ | E |
| pH | 7.4 | 7.5 | 7.5 | 7.3 | | | | |
| PV (p.p.m.) | 46 | 17 | 11 | 6 | 54 | 13 | 13 | 10 |
| COD (p.p.m.) | 330 | 126 | 58 | 8 | 454 | 135 | 116 | |
| BOD (p.p.m.) | 192 | 129 | 44 | 37 | 285 | 91 | 42 | 28 |
| NH$_4$ (p.p.m.) | 44 | 27 | 33 | 33 | 75 | 38 | 41 | 44 |
| NO$^3$ | Nil | Trace | Positive | Positive | Nil | Trace | Positive | Positive |
| Sludge volume (percent) | | 98 | 64 | | | 95 | 70.5 | |
| Sludge volume index | | 62.8 | | | | 62.5 | 82.8 | |
| Suspended solids (105° C.) (p.p.m.) | | 15,600 | 6,400 | 30 | | 15,200 | 8,510 | 62 |
| Suspended solids (600° C.) (p.p.m.) | | 5,000 | 2,000 | Nil | | 4,950 | 2,760 | 2 |
| DO (percent of saturation) | | 52 | 67 | 16 | | 64 | 38 | 3.5 |

TABLE III

| | Example IX Temperature, 17° C. | | | | Example X Temperature, 18.5° C. | | | |
|---|---|---|---|---|---|---|---|---|
| | P | T₁ | T₂ | E | P | T₁ | T₂ | E |
| pH | | | | | 6.7 | 6.5 | 6.6 | 6.6 |
| PV (p.p.m.) | 47 | 11 | 8 | 9 | 47 | 18 | 11 | 8 |
| COD (p.p.m.) | 624 | 102 | 109 | 87 | | 166 | 78 | 56 |
| BOD (p.p.m.) | 342 | 38 | 22 | 15 | 420 | 144 | 30 | 21 |
| NH₄ (p.p.m.) | 73 | 26 | 29 | 33 | 54 | 30 | 27 | 12 |
| NO₃ | Nil | Positive | Positive | Positive | | | | |
| Settled sludge volume (percent) | | 97 | 75 | | | 96 | 53.5 | |
| Sludge volume index | | 58 | 89 | | | 79 | 63.5 | |
| Suspended solids (105° C.), (p.p.m.) | | 16,700 | 8,420 | 12 | | 12,180 | 8,400 | |
| Suspended solids (600° C.), (p.p.m.) | | 4,600 | 2,020 | 2 | | 3,580 | 2,400 | |
| DO (percent of saturation) | | 71 | 63 | | | 45 | 36 | 1.1 |

*Example XI.—Primary settled sewage* pH ---------------------------------------- 7.3
PV ----------------------------------p.p.m-- 61
COD ---------------------------------p.p.m-- 640
BOD ---------------------------------p.p.m-- 238
NO₂ ---------------------------------------- Nil
NO₂+NO₃ ------------------------------------ Nil
NH₄ ---------------------------------p.p.m-- 73

This primary settled sewage was treated at 13° C. in apparatus corresponding to the second modified form of the apparatus shown in the drawings under conditions corresponding to those of Example I. Nitrifying bacteria were present.

The following results were obtained:

TABLE IV

| | From Aeration Tank (14) | Effluent From Settling Tank (16) |
|---|---|---|
| pH | 8.1 | 8.2 |
| PV (p.p.m.) | 10 | 10 |
| COD (p.p.m.) | 89 | 113 |
| BOD (p.p.m.) | 23 | 6 |
| NO₂ | Positive | Positive |
| NO₂+NO₃ | Positive | Positive |
| NH₄ (p.p.m.) | 43 | 39 |
| Settled sludge volume (percent) | 59 | |
| Sludge volume index | 90.8 | |
| Suspended solids (105° C.), (p.p.m.) | 6,500 | 10 |
| Suspended solids (600° C.), (p.p.m.) | 1,600 | Nil |
| DO (Percent of saturation) | 71 | 11 |

*Examples XII–XIV*

The procedure of Example XI was substantially repeated; Examples XII–XIV are summarised in Table IV below.

*Example XV.—Primary settled sewage* pH ---------------------------------------- 7.6
PV ----------------------------------p.p.m-- 28
COD ---------------------------------p.p.m-- 250
BOD ---------------------------------p.p.m-- 107
NO₂ ---------------------------------------- positive
NO₂+NO₃ ------------------------------------ positive
NH₄ ---------------------------------p.p.m-- 44

The procedure of Example XI was substantially repeated, the sewage being treated at 6° C.

Results:

| | From Aeration Tank | Effluent From Settling Tank |
|---|---|---|
| pH | 7.7 | 7.8 |
| PV (p.p.m.) | 7 | 7 |
| COD (p.p.m.) | 70 | 55 |
| BOD (p.p.m.) | 4 | 4 |
| NO₂ | Positive | Positive |
| NO₂+NO₃ | Positive | Postiive |
| NH₄ (p.p.m.) | 44 | 33 |
| Settled sludge volume (percent) | 89 | |
| Sludge volume index | 91 | |
| Suspended solids (105° C.), (p.p.m.) | 9,800 | 20 |
| Suspended solids (600° C.), (p.p.m.) | 3,600 | 4 |
| DO (percent of saturation) | 96 | 62 |

We claim:

1. In a method of treating primary settled sewage for disposal by the steps of aerating the sewage in contact with an activated sludge, settling sludge from the aerated material, and recycling sludge from the settling step to the aeration step, the improvement comprising providing (a) a suspended solids concentration (105° C.) in at least part of the aeration step between 12,240 and 30,000 parts per million, and (b) a dissolved oxygen concentration of

TABLE IV

| | Example XII Temperature, 14° C. | | | Example XIII Temperature, 13° C. | | | Example XIV Temperature, 9° C. | | |
|---|---|---|---|---|---|---|---|---|---|
| | P | T | E | P | T | E | P | T | E |
| pH | 7.2 | 7.5 | 7.7 | 6.7 | 6.8 | 7.0 | 7.4 | 7.7 | 8.0 |
| PV (p.p.m.) | 47 | 9 | 8 | 38 | 6 | 4 | 3.9 | 9 | 8 |
| COD (p.p.m.) | 430 | 84 | 113 | 350 | 55 | 45 | 260 | 58 | 21 |
| BOD (p.p.m.) | 131 | 6 | Nil | 153 | 11 | 11 | 123 | 10 | 20 |
| NO₂ | Positive | | Positive | Positive | Positive | Positive | Positive | Positive | Positive |
| NO₂+NO₃ | Positive | | Positive | Positive | Positive | Positive | Positive | Positive | Positive |
| NH₄ (p.p.m.) | 46 | 31 | 27 | 44 | 26 | 20 | 54 | 24 | 30 |
| Settled sludge volume (percent) | | 82 | | | 45 | | | 55 | |
| Sludge volume index | | 95.4 | | | 70.1 | | | 72.6 | |
| Suspended solids (105° C.), (p.p.m.) | | 8,600 | Nil | | 6,400 | | | 7,560 | 48 |
| Suspended solids (600° C.), (p.p.m.) | | 2,800 | Nil | | 1,800 | | | 2,520 | 2 |
| DO (percent of saturation) | | 66 | 14 | | 94 | 32 | | 83 | 37 | the material passing from the aeration step to the settling step of at least 30% of saturation.

2. In a method of treating primary settled sewage for disposal by the steps of aerating the sewage in contact with an activated sludge, settling sludge from the aerated material, and recycling sludge from the settling step to the aeration step, the improvement comprising (a) a suspended solids concentration (105° C.) in at least part of the aeration step between 12,240 and 30,000 parts per million, (b) a dissolved oxygen concentration of the material passing from the aeration step to the settling step of at least 30% of saturation, and (c) nitrifying bacteria for the removal of ammonia.

References Cited

UNITED STATES PATENTS 1,904,916  4/1933  Combs _____ 210—5

OTHER REFERENCES

Metcalf, L. et al.: American Sewerage Practive, vol. III, disposal of sewage, third edition, 1935, McGraw-Hill, pp. 63–66 and 76–78 relied on (Gr. 170).

Pasveer, A.: Research etc., V rate of Biochemical Oxidation, Sew. and Ind. wastes, July 1955, vol. 27, pp. 783–792 (P.O.S.L.).

Keher, D. et al.: Experiments on the High-Rate activated sludge process, Journal WPCF, vol. 32, Oct. 1960, pp. 1066–1080 (P.O.S.L.).

Von Der Emde, W.: Aspects of the High Rate A. S. etc. appearing in Biol. Waste Treatment, edited by Eckenfelder, W. W. et al., 1963, MacMillan Co., pp. 299–301, 303–306, 311, 312 and 315–317 relied on (P.O.S.L.).

MICHAEL E. ROGERS, *Primary Examiner.*

UNITED STATES PATENT OFFICE
CERTIFICATE OF CORRECTION

Patent No. 3,412,017 November 19, 1968

James W. Abson et al.

It is certified that error appears in the above identified patent and that said Letters Patent are hereby corrected as shown below:

In the heading to the printed specification, line 4, "Simon-Carnes Limit should read -- Simon-Carves Limited --. Column 5, lines 8 and 35 and column 6 line 5, "$NH^4$", each occurrence, should read -- $NH_4$ --. Column 5, line 22, "50" should read -- 59 --. Columns 5 and 6, TABLE I, first column, line 5 thereof, "$NH^4$" should read -- $NH_4$ --; same TABLE I, same first column, line 6 thereof, "$NO^3$" should read -- $NO_3$ --. Column 9, line 7, after "comprising" insert -- providing --.

Signed and sealed this 10th day of March 1970.

(SEAL)
Attest:

EDWARD M. FLETCHER, JR.
Attesting Officer

WILLIAM E. SCHUYLER,
Commissioner of Paten